(12) United States Patent
Okada et al.

(10) Patent No.: US 8,985,072 B2
(45) Date of Patent: Mar. 24, 2015

(54) PISTON STRUCTURE FOR INTERNAL COMBUSTION ENGINE

(71) Applicant: Honda Motor Co., Ltd., Tokyo (JP)

(72) Inventors: Nozomi Okada, Wako (JP); Masakazu Hoshino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 13/940,849

(22) Filed: Jul. 12, 2013

(65) Prior Publication Data

US 2014/0026840 A1  Jan. 30, 2014

(30) Foreign Application Priority Data

Jul. 27, 2012 (JP) ................... 2012-166966

(51) Int. Cl.
| | |
|---|---|
| F02B 25/00 | (2006.01) |
| F02B 23/00 | (2006.01) |
| F02F 3/00 | (2006.01) |
| F02B 23/08 | (2006.01) |
| B23P 15/10 | (2006.01) |
| F02F 3/24 | (2006.01) |

(52) U.S. Cl.
CPC ........................ F02F 3/24 (2013.01)
USPC .................. 123/73 AA; 123/661; 123/193.6; 123/657; 29/888.04

(58) Field of Classification Search
USPC ........... 123/193.6, 90.16, 90.31, 305, 73 AA, 123/657–671; 29/888.041, 888.042, 888.05
See application file for complete search history.

(56) References Cited

FOREIGN PATENT DOCUMENTS

JP 2009-121324 A 6/2009

*Primary Examiner* — Lindsay Low
*Assistant Examiner* — Syed O Hasan
(74) *Attorney, Agent, or Firm* — Westerman, Hattori, Daniels & Adrian, LLP

(57) ABSTRACT

A piston structure for a four-stroke internal combustion engine is provided, enabling an increase in the intake efficiency and a favorable ignitability to improve the performance of the internal combustion engine. In a piston structure for a four-valve four-stroke internal combustion engine, a piston crown includes: an intake-side inclined flat surface formed in a single plane by bottom surfaces of a pair of intake valve recesses and an intake-side common flat surface; and an exhaust-side inclined flat surface formed in a single plane by bottom surfaces of a pair of exhaust valve recesses and an exhaust-side common flat surface. The intake-side inclined flat surface and the exhaust-side inclined flat surface are formed into a pent-roof shape with a ridge line at an intersection therebetween. The exhaust-side inclined flat surface extends into the intake valve recesses, and the ridge line is located on a side of the intake valve recesses.

18 Claims, 11 Drawing Sheets

PISTON STRUCTURE FOR INTERNAL
COMBUSTION ENGINE

CROSS-REFERENCE TO RELATED APPLICATIONS

The present application claims priority under 35 U.S.C. §119 to Japanese Patent Application No. 2012-166966, filed Jul. 27, 2012, the contents of which is incorporated herein, by reference, in its entirety.

TECHNICAL FIELD

The present invention relates to a piston structure for a four-valve four-stroke internal combustion engine.

BACKGROUND OF THE INVENTION

In general, in order to increase the compression ratio, a four-stroke internal combustion engine is designed to have a combustion chamber made as small as possible in volume in a state where a piston is at a top dead center by forming a piston crown into such a bulged shape as to match a ceiling surface of the combustion chamber; and providing the piston crown with valve recesses that are recesses for avoiding interference with valves.

There is an example of a four-valve four-stroke internal combustion engine in which a piston crown is bulged into a pent-roof shape, and paired intake valve recesses and paired exhaust valve recesses are formed on the piston crown (see Japanese Patent Application Publication No. 2009-121324).

The four-stroke internal combustion engine disclosed in Japanese Patent Application Publication No. 2009-121324 is mounted on a motorcycle with a cylinder disposed in a posture of standing substantially upward. A pair of right and left intake ports are opened on a front side of a pent-roof ceiling surface of a combustion chamber, and extend obliquely frontward; meanwhile, a pair of right and left exhaust ports are opened on a rear side of the ceiling surface, and extend rearward.

The piston crown is bulged into such a pent-roof shape so as to match the ceiling surface of the combustion chamber. The piston crown is provided with a pair of right and left intake valve recesses for avoiding interference with a pair of intake valves configured to open and close intake inlets of the pair of intake ports on the ceiling surface; and a pair of right and left exhaust valve recesses for avoiding interference with a pair of exhaust valves configured to open and close exhaust outlets of the pair of exhaust ports.

Intake-side inclined flat surfaces formed by bottom surfaces of the pair of intake valve recesses and exhaust-side inclined flat surfaces formed by bottom surfaces of the pair of exhaust valve recesses intersect each other such that a pent-roof shape matches the ceiling surface of the combustion chamber.

SUMMARY OF THE INVENTION

A head portion of the intake valve has a larger diameter than that of the exhaust valve. Accordingly, the intake valve recesses are larger than the exhaust valve recesses.

Hence, the intake-side inclined flat surfaces are larger in area than the exhaust-side inclined flat surfaces, and a ridge line where the intake-side inclined flat surfaces intersect the exhaust-side inclined flat surfaces is offset to the exhaust side.

The ridge line offset to the exhaust side completely separates the intake-side inclined flat surfaces and the exhaust-side inclined flat surfaces from each other.

When the piston is at the top dead center with the intake valves and the exhaust valves opened at the same time in an overlapping manner, part of intake air sucked through the intake inlets of the intake valves into the combustion chamber is blocked by the ridge line and hardly flows into the exhaust-side inclined flat surface side. The flowing of the intake air is restricted and confined only to the intake-side inclined flat surface side. Hence, a further improvement in the intake efficiency has been desired.

A piston structure for a four-stroke internal combustion engine is provided, enabling an increase in the intake efficiency and a favorable ignitability to improve the performance of the internal combustion engine.

A first aspect is a piston structure for a four-valve four-stroke internal combustion engine in which a pair of intake valves and a pair of exhaust valves are provided in a cylinder head at positions around a spark plug located approximately on a cylinder central axis and are disposed into a V shape facing a combustion chamber. In the piston structure, a piston crown of a piston includes:

intake valve recesses and exhaust valve recesses respectively formed to face head portions of the intake valves and head portions of the exhaust valves;

an intake-side inclined flat surface formed in a single plane by bottom surfaces of a pair of the intake valve recesses and an intake-side common flat surface formed by extending from the bottom surfaces of the pair of intake valve recesses toward a center of the piston crown to make the bottom surfaces continuous with each other; and an exhaust-side inclined flat surface formed in a single plane by bottom surfaces of a pair of the exhaust valve recesses and an exhaust-side common flat surface formed by extending from the bottom surfaces of the pair of exhaust valve recesses toward the center of the piston crown to make the bottom surfaces continuous with each other, the intake-side inclined flat surface and the exhaust-side inclined flat surface are formed into a pent-roof shape with a ridge line at an intersection therebetween, and the exhaust-side inclined flat surface extends into the intake valve recesses, and the ridge line is located on a side of the intake valve recesses.

A second aspect is the piston structure for internal combustion engine, in which an exhaust-side end portions, extending to an exhaust side, of inner peripheral walls of the intake valve recesses are formed at positions on the exhaust side beyond the ridge line in such a manner as to extend around outer-peripheral end portions of the ridge line.

A third aspect is the piston structure for internal combustion engine, in which, in a plan view of the piston crown, tangent lines at the exhaust-side end portions on curved wall surfaces of the inner peripheral walls of the intake valve recesses extend on the exhaust-side inclined flat surface without intersecting inner peripheral walls of the exhaust valve recesses at a central portion of the piston crown.

A fourth aspect is the piston structure for internal combustion engine, in which the ridge line is located substantially right above and in parallel to a pin hole central axis of a pin boss portion pivotally supporting a piston pin.

A fifth aspect is the piston structure for internal combustion engine, in which intake ports opened to the combustion chamber extend from curved portions thereof near intake inlets to an upstream side at an angle of 45 degrees or less with respect to a plane perpendicular to the cylinder central axis.

A sixth aspect is the piston structure for internal combustion engine, in which the internal combustion engine is mounted on a small vehicle with the cylinder central axis directed substantially vertically, and the intake ports extend rearward.

The piston structure for internal combustion engine according to the first aspect is the piston structure for a four-valve four-stroke internal combustion engine in which the pair of intake valves and the pair of exhaust valves are provided in the cylinder head at positions around the spark plug located approximately on the cylinder central axis and are disposed into a V shape facing a combustion chamber. The piston crown of the piston includes: the intake-side inclined flat surface formed in a single plane by the bottom surfaces of the pair of the intake valve recesses and the intake-side common flat surface; and the exhaust-side inclined flat surface formed in a single plane by the bottom surfaces of the pair of the exhaust valve recesses and the exhaust-side common flat surface. The intake-side inclined flat surface and the exhaust-side inclined flat surface are formed into a pent-roof shape with the ridge line at the intersection therebetween. Accordingly, the piston crown is formed along a ceiling surface of the combustion chamber, which the intake valves and the exhaust valves disposed into a V shape each other face. Thus, the volume of the combustion chamber is made as small as possible when the piston is at top dead center, making it possible to increase the compression ratio.

Moreover, the exhaust-side inclined flat surface extends into the intake valve recesses, and the ridge line is located on the side of the intake valve recesses. Accordingly, even when the piston is at the top dead center, part of intake air sucked into the combustion chamber along the head portions of the intake valves from the intake inlets opened and closed by the intake valves of the intake valves and the exhaust valves, which are opened together in synchronism, directly flows to the exhaust-side inclined flat surface side beyond the ridge line. Thus, the flow of intake air is not restricted to the intake-side inclined flat surface side, and the intake efficiency can be increased.

When the piston is at the top dead center, intake air also flows to the exhaust-side inclined flat surface side. The intake air spreads and flows not only to the intake side but also to the exhaust side. This can make favorable the ignitability of the spark plug located approximately on the cylinder central axis extending to the center of the piston crown.

In the piston structure for internal combustion engine according to the second aspect, the exhaust-side end portions, extending to the exhaust side, of the inner peripheral walls of the intake valve recesses are formed at positions on the exhaust side beyond the ridge line in such a manner as to extend around the outer-peripheral end portions of the ridge line. Accordingly, when the piston is at the top dead center, of the intake air sucked into the combustion chamber through the intake inlets opened and closed by the intake valves, intake air guided to the inner peripheral walls of the intake valve recesses can flow to the exhaust-side inclined flat surface side from the exhaust-side end portions after going around the outer-peripheral end portions of the ridge line. Thus, the intake efficiency can be further increased.

In the piston structure for internal combustion engine according to the third aspect, in the plan view of the piston crown, the tangent lines at the exhaust-side end portions on the inner peripheral walls of the intake valve recesses extend on the exhaust-side inclined flat surface without intersecting the inner peripheral walls of the exhaust valve recesses at the central portion of the piston crown. Accordingly, when the piston is at the top dead center, intake air is guided to the inner peripheral walls of the exhaust valve recesses and then flows to the exhaust-side inclined flat surface side in directions of the tangent lines from the exhaust-side end portions in such a manner as to go around the outer-peripheral end portions of the ridge line smoothly along the exhaust-side common flat surface without being blocked by the inner peripheral walls of the exhaust valve recesses. Thereby, the intake efficiency is increased, and the intake air flows in toward the central portion of the piston crown. This can make more favorable the ignitability of the spark plug located approximately on the cylinder central axis.

In the piston structure for internal combustion engine according to the fourth aspect, the ridge line is located substantially right above and in parallel to the pin hole central axis of the pin boss portion pivotally supporting the piston pin. This makes it possible to increase the engine performance by forming a thick upper portion of the pin boss portion to ensure that the pin boss portion has a sufficient strength and by forming the pin hole close to the piston crown to reduce the weight of the piston.

In the piston structure for internal combustion engine according to the fifth aspect, the intake ports opened to the combustion chamber extend from the curved portions near the intake inlets to the upstream side at the angle of 45 degrees or less with respect to the plane perpendicular to the cylinder central axis that is a central axis of a cylinder bore. Accordingly, the intake air sucked into the combustion chamber from the intake ports increases the amount flowing to the exhaust side. When the piston is at the top dead center, the amount of intake air directly flowing to the exhaust-side inclined flat surface side is particularly increased. Thus, the intake efficiency can be more increased.

In the piston structure for internal combustion engine according to the sixth aspect, the internal combustion engine is mounted on a small vehicle with the cylinder central axis directed substantially vertically, and the intake ports extend to the rear side of the vehicle. Accordingly, an air cleaner connected to the intake ports can be disposed at a low position below a seat. The height of the seat is lowered and confined, and the longitudinal length of the vehicle is shortened and confined. Thus, the size reduction of the vehicle is achieved.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, an embodiment of the present invention will be described based on FIGS. 1 to 11.

Figure 1:
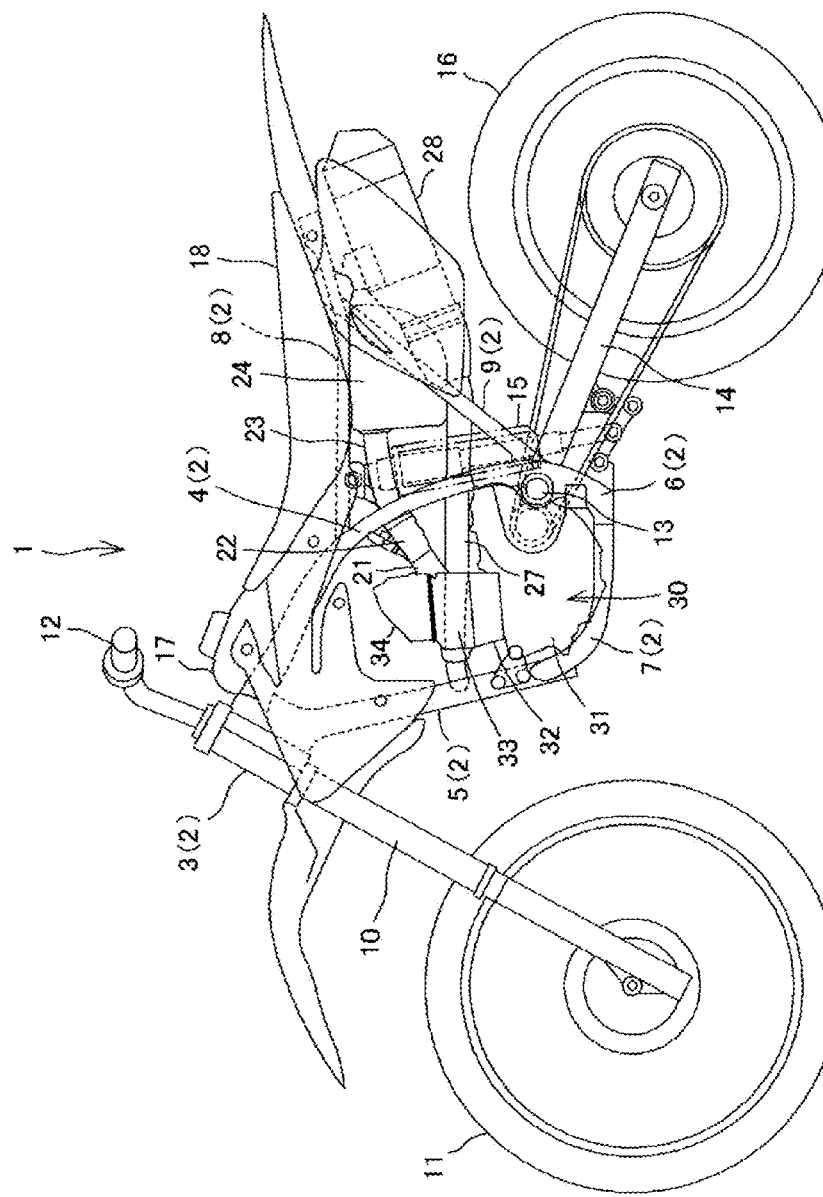
FIG. 1 is a side view of a motorcycle on which an internal combustion engine according to an embodiment of the present invention is mounted.

FIG. 1 shows an off-road motorcycle 1 on which an internal combustion engine 30 according to the embodiment is mounted.

A vehicle body frame 2 of the motorcycle 1 includes: a main frame 4 extending rearward from a head pipe 3 and curved and extending downward; a down frame 5 extending downward from the head pipe 3; and a center frame 6 located at a lower end of the main frame 4 and connected to a lower end of the down frame 5 through a lower frame 7. In this manner, the vehicle body frame 2 has a looped configuration, in which the internal combustion engine 30 is suspended.

A seat rail 8 extends rearward from an upper portion of the main frame 4. A rear frame 9 is bridged between the seat rail 8 and the center frame 6.

A front fork 10 is rotatably and pivotally supported by the head pipe 3. A front wheel 11 is pivotally supported at a lower end of the front fork 10, and is steered with a handlebar 12.

A rear fork 14 extends rearward from the center frame 6 at which a front end of the rear fork 14 is pivotally supported by a pivot shaft 13. A rear wheel 16 is vertically swingably and pivotally supported at a rear end of the rear fork 14.

A rear cushion 15 is interposed between the rear fork 14 and a front portion of the seat rail 8.

Above the internal combustion engine 30, a fuel tank 17 is supported by the main frame 4. A seat 18 is provided behind the fuel tank 7 and supported by the seat rail 8.

The internal combustion engine 30 is supported by the vehicle body frame 2 while a cylinder (cylinder block 32) is disposed in a posture of standing substantially upward. An intake pipe 21 extends rearward from a cylinder head 33 and slightly obliquely upward, and is connected to a throttle body 22. An intake connecting pipe 23 extending rearward from the throttle body 22 is connected to an air cleaner 24 disposed below the seat 18.

Figure 2:
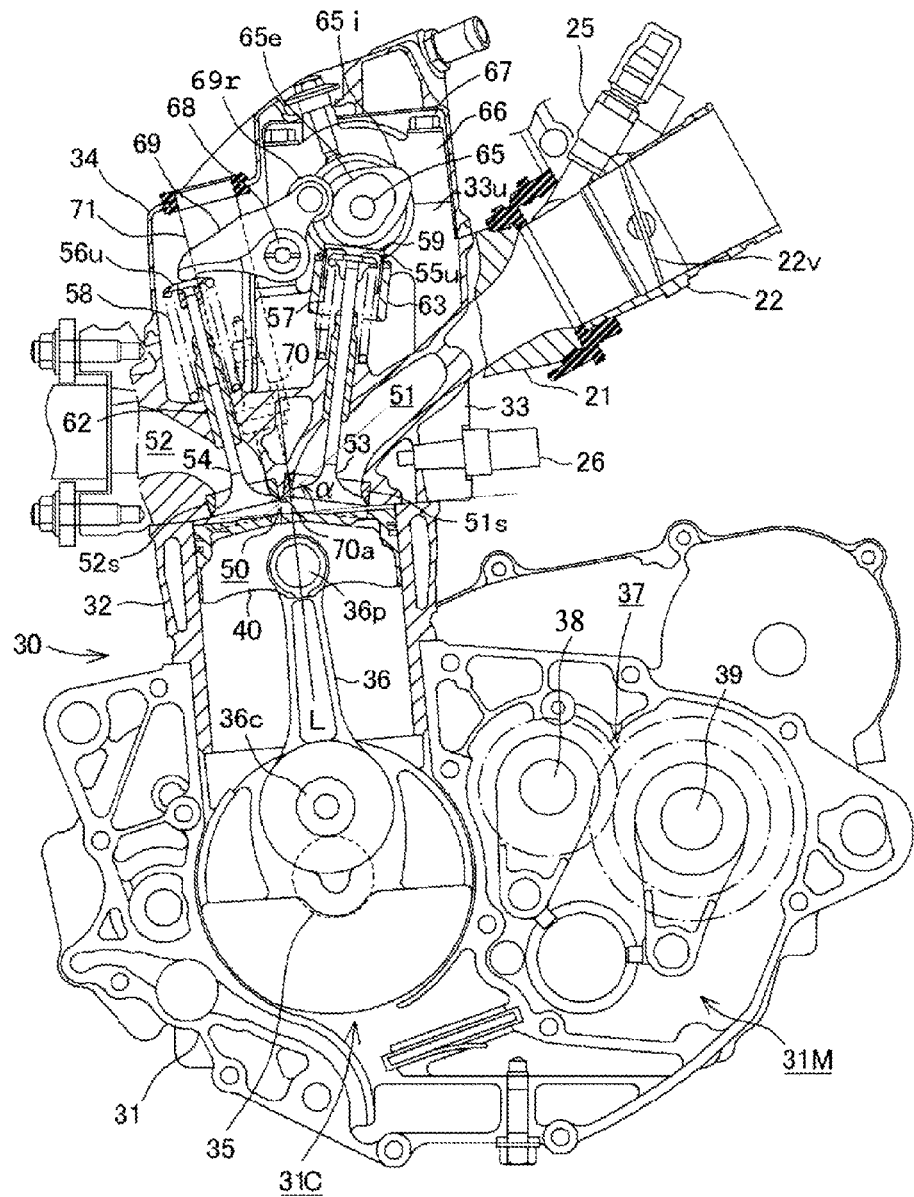
FIG. 2 is a schematic sectional view of the entire internal combustion engine seen from the left side.

The throttle body 22 is provided with a fuel injection valve 25 downstream of a throttle valve 22v (see FIG. 2).

An exhaust pipe 27 extending frontward from the cylinder head 33 extends around the cylinder head 33, as viewed from the right, and extends rearward along the right side of the internal combustion engine 30. Then, the exhaust pipe 27 is connected to a muffler 28 hanging at a rear portion of the seat rail 8.

As described above, the internal combustion engine 30 mounted on the motorcycle 1 is a water-cooled, single-cylinder, four-valve four-stroke internal combustion engine.

FIG. 2 is a schematic sectional view of the entire internal combustion engine 30 seen from the left side thereof and mounted on the vehicle body.

A crankcase 31 separable into right and left parts has a crank chamber 31C on the front side, and a transmission chamber 31M on the rear side. The crank block 32 is fitted into the front-side crank chamber 31C while slightly inclined to the front. The cylinder head 33 is overlaid on the cylinder block 32. Further, the cylinder head 33 is covered with a cylinder head cover 34.

Below the intake pipe 21, a water temperature sensor 26 is attached to the cylinder head 33 in such a manner that a detector of the water temperature sensor 26 faces a water jacket.

In the crank chamber 31C, a crank pin 36c of a crankshaft 35 disposed in a right-left direction and rotatably and pivotally supported by the crankcase 31 is connected to a piston pin 36p of a piston 40 through a connecting rod 36. The piston 40 is configured to reciprocally slide within a cylinder bore of the cylinder block 32.

In the transmission chamber 31M, a transmission mechanism 37 is disposed. The transmission mechanism 37 is configured to transmit power between a mainshaft 38 and a countershaft 39 with a pair of transmission gear trains.

Figure 10:
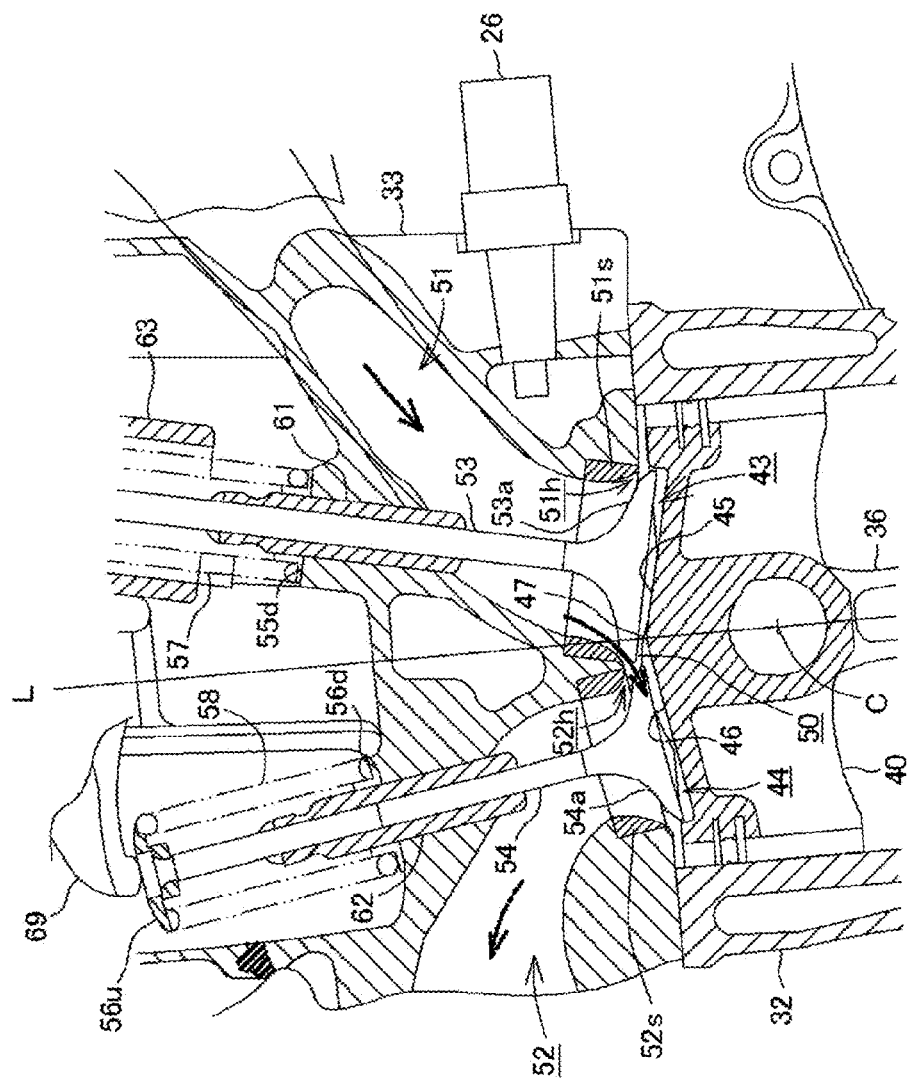
FIG. 10 is a sectional view for illustrating a state of surroundings of a combustion chamber when the piston is at a top dead center.

A combustion chamber 50 is formed between a piston crown 41 of the piston 40; configured to reciprocally slide within the cylinder bore; and a ceiling surface of the cylinder head 33, which the piston crown 41 faces (see FIGS. 2, 10).

Figure 3:
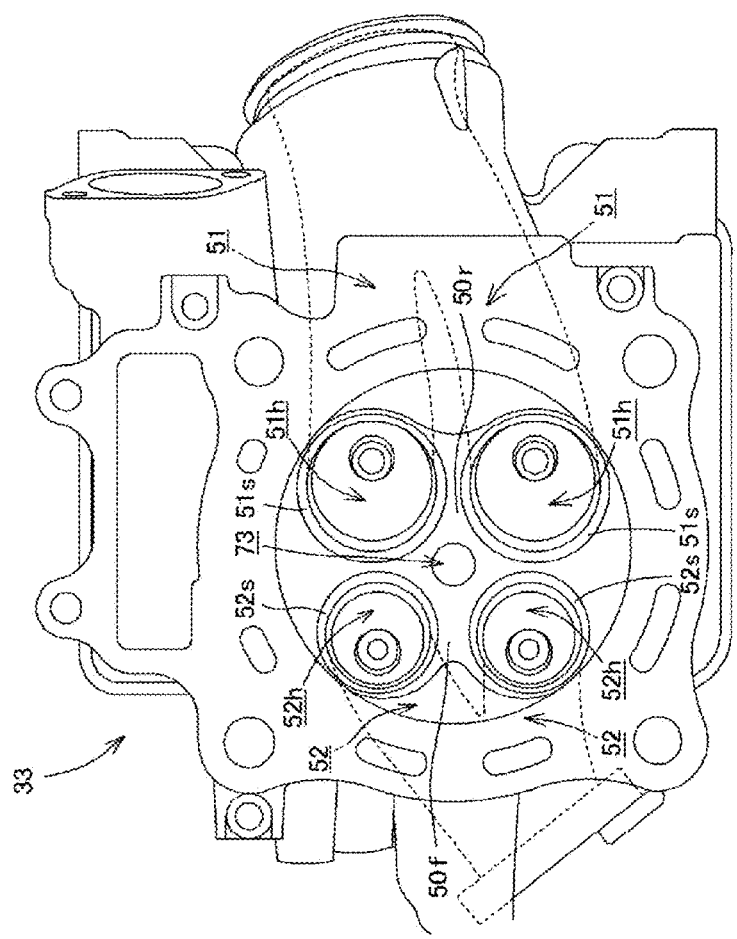
FIG. 3 is a bottom view of a cylinder head.
Figure 4:
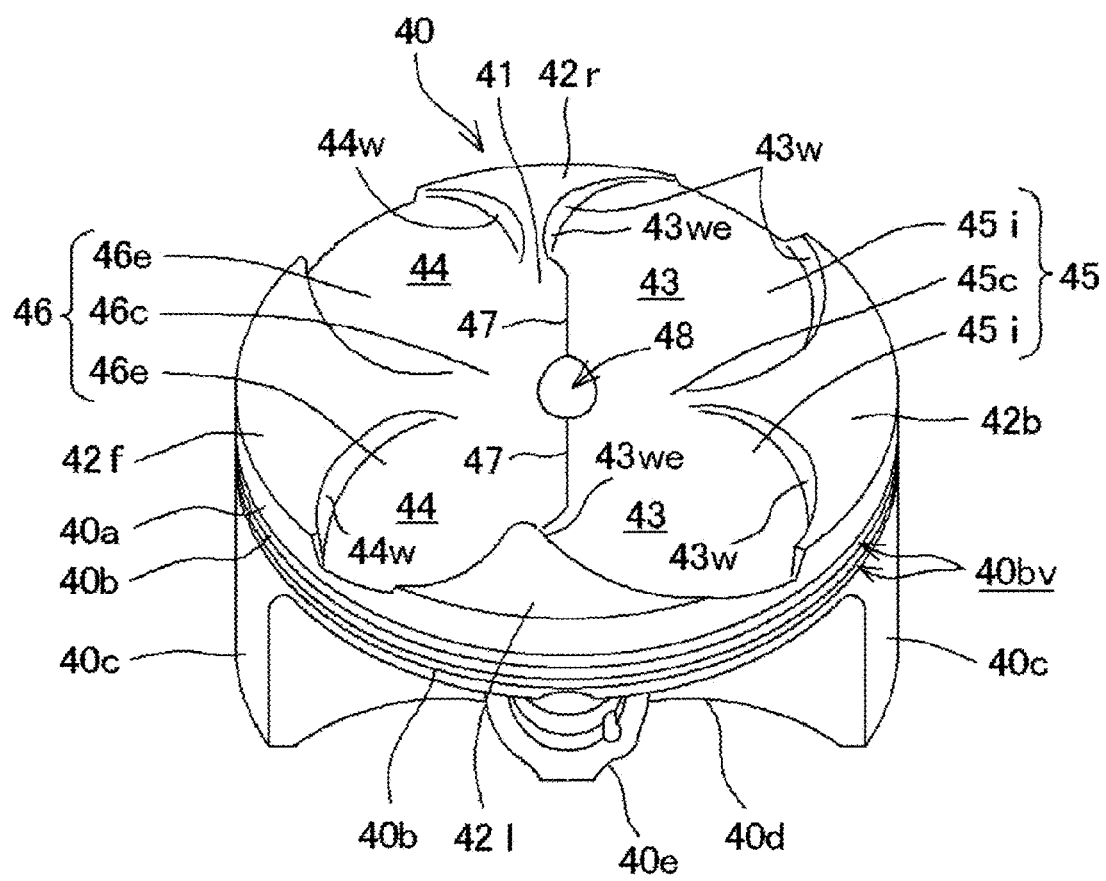
FIG. 4 is a perspective view of a piston.

The combustion chamber 50 is a pent-roof combustion chamber with the ceiling surface of the cylinder head 33 being formed into a delta roof of a pent-roof shape. As shown in FIG. 3, intake inlets 51h of paired right and left intake ports 51 are formed in a rear-half inclined ceiling surface 50r and surrounded by annular valve seats 51s; meanwhile, exhaust inlets 52h of paired right and left exhaust ports 52 are formed in a front-half inclined ceiling surface 50f and surrounded by annular valve seats 52s.

The right and left intake ports 51 are curved and extend rearward from the right and left intake inlets 51h in the rear-half inclined ceiling surface of the combustion chamber 50, and then converge together and are connected to the intake pipe 21 (see FIGS. 2, 3).

The intake ports 51 extend from their curved portion near the opening rearward to the upstream side at an angle α of 45 degrees or lower with respect to a plane (for example, an opening edge surface of the cylinder bore) perpendicular to a cylinder central axis L (see FIG. 2).

The right and left exhaust ports 52 are curved and extend frontward from the right and left exhaust inlets 52h in the front-half inclined ceiling surface of the combustion chamber 50, and converge together and are connected to the exhaust pipe 27 (see FIGS. 2, 3).

As shown in FIG. 2, in the combustion chamber 50, an intake valve 53 configured to open and close the intake inlet 51h of the intake port 51 is slidably guided by a valve guide 61. A valve lifter 59 covering an upper end of a valve stem of the intake valve 53 is slidably guided by a lifter guide 63.

The intake valve 53 is biased in a valve-closing (upward) direction by a valve spring 57 interposed between an upper retainer 55u fitted onto the upper end of the valve stem and a lower retainer 55d abutting an upper surface of the cylinder head 33.

Meanwhile, in the combustion chamber 50, an exhaust valve 54 configured to open and close the exhaust inlet 52h of the exhaust port 52 is slidably guided by a valve guide 62. The exhaust valve 54 is biased in a valve-closing (upward) direction by a valve spring 58 interposed between an upper retainer 56u fitted onto an upper end of a valve stem of the exhaust valve 54 and a lower retainer 56d abutting the upper surface of the cylinder head 33.

A camshaft 65 disposed in the right-left direction and located above and on the extension line of the valve stem of the intake valve 53 is rotatably and pivotally supported in such a manner as to be sandwiched by camshaft holders 66 overlaid on and fixed with a bolt 67 to upper end surfaces of bearing walls 33w provided upright, opposite to each other in the right-left direction, from the upper surface of the cylinder head 33.

The camshaft 65 has intake cam lobes 65i formed on the right and left sides, and an exhaust cam lobe 65e formed between the right and left intake cam lobes 65i.

The right and left intake cam lobes 65i are in direct contact with upper surfaces of the valve lifters 59 provided on the upper ends of the right and left intake valves 53.

A rocker arm shaft 68 is bridged nearly in front of the bearing walls 33w opposite to each other in the right-left direction, of the cylinder head 33. The rocker arm shaft 68 penetrates and is configured to swingably and pivotally support a rocker arm 69.

A roller 69r is pivotally supported at a tip end of a rear-side portion of the rocker arm 69 extending rearward. The roller 69r is in contact with the exhaust cam lobe 65e of the camshaft 65. A front-side portion of the rocker arm 69 extending frontward is bifurcated in the right-left direction, and tip ends of the branch portions are in contact with upper end surfaces of the valve stems of the right and left exhaust valves 54.

Hence, when the camshaft 65 rotates, rotations of the right and left intake cam lobes 65i cause the right and left intake valves 53 to slide and open or close the intake inlets 51h of the combustion chamber 50. A rotation of the central exhaust cam lobe 65e causes the rocker arm 69 to swing through the roller 69r, and the tip ends of the front-side branch portions cause the exhaust valves 54 to slide and open or close the exhaust inlets 52h of the combustion chamber 50.

A cam chain (unillustrated) is wound around the camshaft 65 and the crankshaft 35. Thereby, the camshaft 65 opens or closes the intake valves 53 and the exhaust valves 54 in synchronism with the rotation of the crankshaft 35 of the internal combustion engine 30.

Moreover, in the upper surface of the cylinder head 33, an electrode hole 73 having a small diameter and sharing the same axis as a spark plug insertion hole is drilled toward the center of the ceiling surface of the combustion chamber 50 and between the right and left valve guides 62 for the exhaust valves 54. The electrode hole 73 is somewhat inclined frontward. A lower portion of a cylindrical spark plug tube 71 is fitted in the spark plug insertion hole.

A spark plug 70 is inserted in the spark plug tube 71. An electrode portion 70a at a tip end of the spark plug 70 is screwed into the electrode hole 73, so that a tip end of the electrode portion 70a faces the combustion chamber 50 (see FIG. 2).

In the four-valve type valve mechanism, the valve angle of the intake valve 53 and the exhaust valve 54 is as low as approximately 20 degrees. Accordingly, the angle formed by the front-half inclined ceiling surface 50f and the rear-half inclined ceiling surface 50r of the pent-roof ceiling surface of the combustion chamber 50 is a supplementary angle of the valve angle, and is as high as approximately 160 degrees.

Of the intake valve 53 and the exhaust valve 54, a head portion of the intake valve 53 has a larger outer diameter than that of a head portion of the exhaust valve 54. Accordingly, as shown in FIG. 3, the right and left intake inlets 51h in the rear-half intake-side inclined ceiling surface 50r of the combustion chamber 50 are opened wider than the right and left exhaust inlets 52h in the front-half exhaust-side inclined ceiling surface 50f. For this reason, the area of the intake-side inclined ceiling surface 50r is larger than that of the exhaust-side inclined ceiling surface 50f, and a ridge line where the intake-side inclined ceiling surface 50r intersects the exhaust-side inclined ceiling surface 50f is offset to the exhaust side, that is, front side (see FIG. 10).

The structure of the piston 40 having the piston crown 41 facing the ceiling surface of the combustion chamber 50 will be described based on FIGS. 4 to 9.

A piston peripheral wall 40b of an oblate-cylindrical shape somewhat extends downward from an outer peripheral portion of a disc-shaped piston crown 40a of the piston 40. Paired front and rear piston skirts 40c are formed to extend further downward from front and rear arc-shaped portions, facing each other, of the piston peripheral wall portion 40b. Right and left end portions of the respective piston skirts 40c are connected to each other through ribs 40d which are parallel to each other.

Further, a pair of right and left pin boss portions 40e are formed to protrude downward from a back surface of the piston crown 40a and to extend coaxially and laterally in the right-left direction from the center where the right and left ribs 40d face each other.

A piston pin 36p bridged within the pair of right and left pin boss portions 40e penetrates a small end of the connecting rod 36 and is pivotally supported.

A piston ring groove 40bv configured to fit onto a piston ring is formed in an outer peripheral surface of the piston peripheral wall portion 40b of the piston 40.

In the piston crown 41 that is a top surface of the piston 40, paired right and left intake valve recesses 43 and paired right and left exhaust valve recesses 44 are formed at positions respectively facing head portions 53a of the intake valves 53 and head portions 54a of the exhaust valves 54. The intake valve recesses 43 and the exhaust valve recesses 44 are circular recesses for avoiding interference with the head portions 53a of the intake valves 53 and the head portions 54a of the exhaust valves 54.

The paired right and left intake valve recesses 43, 43 and the paired right and left exhaust valve recesses 44, 44 form sector-shaped land portions 42f, 42b, 42l, 42r at front, back, right, and left positions in the piston crown 41.

Arc-shaped inner peripheral walls 43w of the intake valve recesses 43 are formed at edges of the land portions 42f, 42l, 42r. Arc-shaped inner peripheral walls 44w of the exhaust valve recesses 44 are formed at edges of the land portions 42b, 42l, 42r.

The intake valve recesses 43 each have a bottom surface (intake valve recess bottom surface) 45i parallel to a bottom surface of the head portion 53a of the intake valve 53. The exhaust valve recesses 44 each have a bottom surface (exhaust valve recess bottom surface) 46e parallel to a bottom surface of the head portion 54a of the exhaust valve 54.

In other words, the intake valve recess bottom surface 45i is parallel to the intake-side inclined ceiling surface 50r of the combustion chamber 50, and the exhaust valve recess bottom surface 46e is parallel to the exhaust-side inclined ceiling surface 50f of the combustion chamber 50. Hence, the intake valve recess bottom surface 45i and the exhaust valve recess bottom surface 46e form inclined surfaces at the supplementary angle of the valve angle, approximately 160 degrees.

Figure 5:
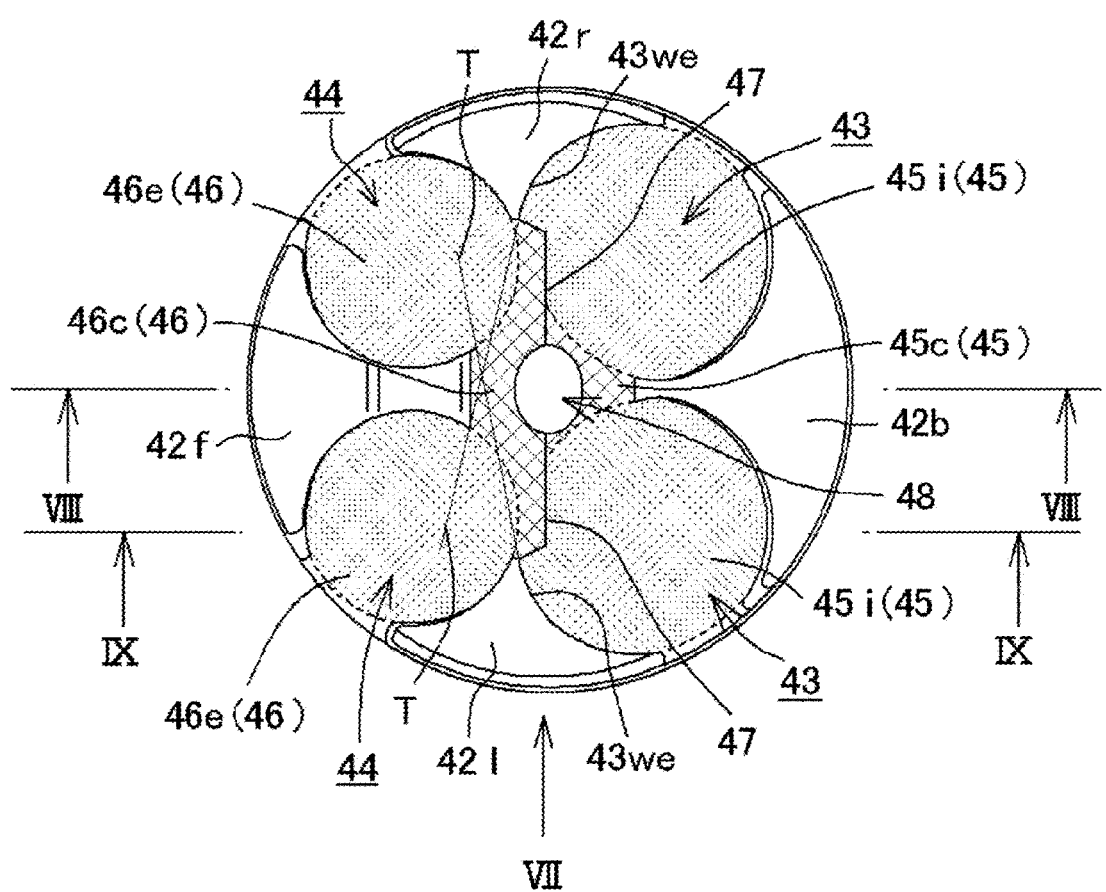
FIG. 5 is an explanatory view showing an upper surface of the piston.
Figure 6:
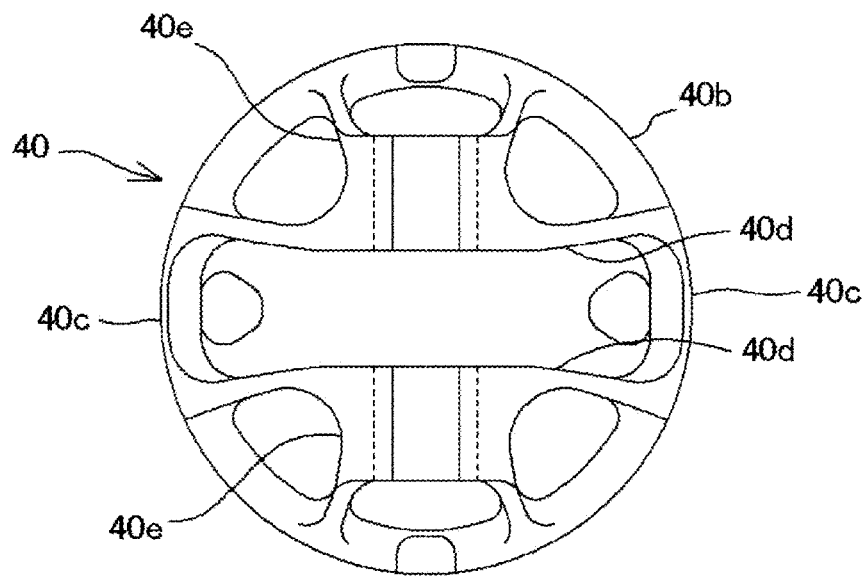
FIG. 6 is a bottom view of the piston.
Figure 7:
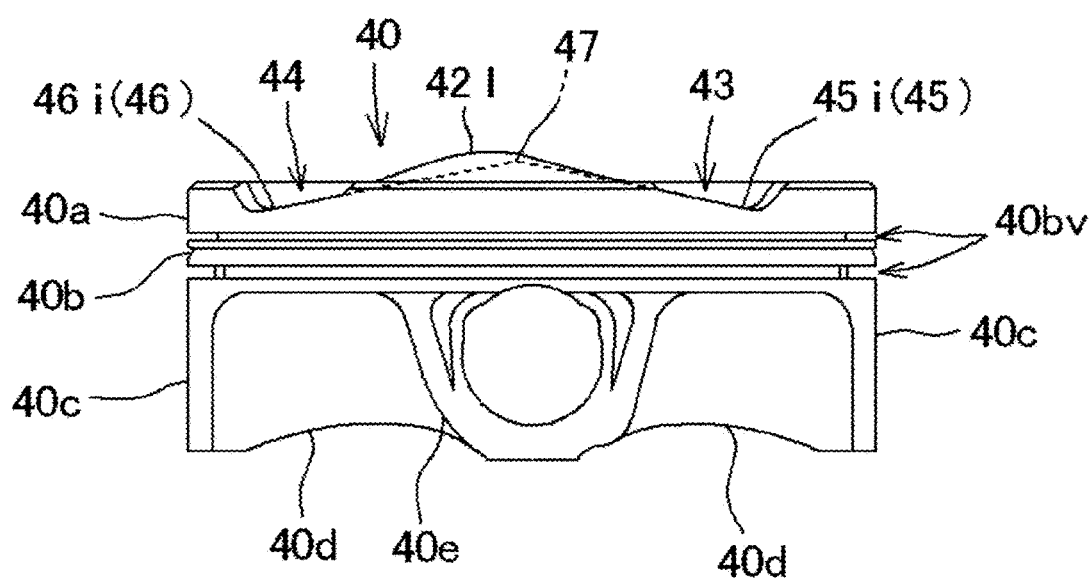
FIG. 7 is a side view of the piston.
Figure 8:
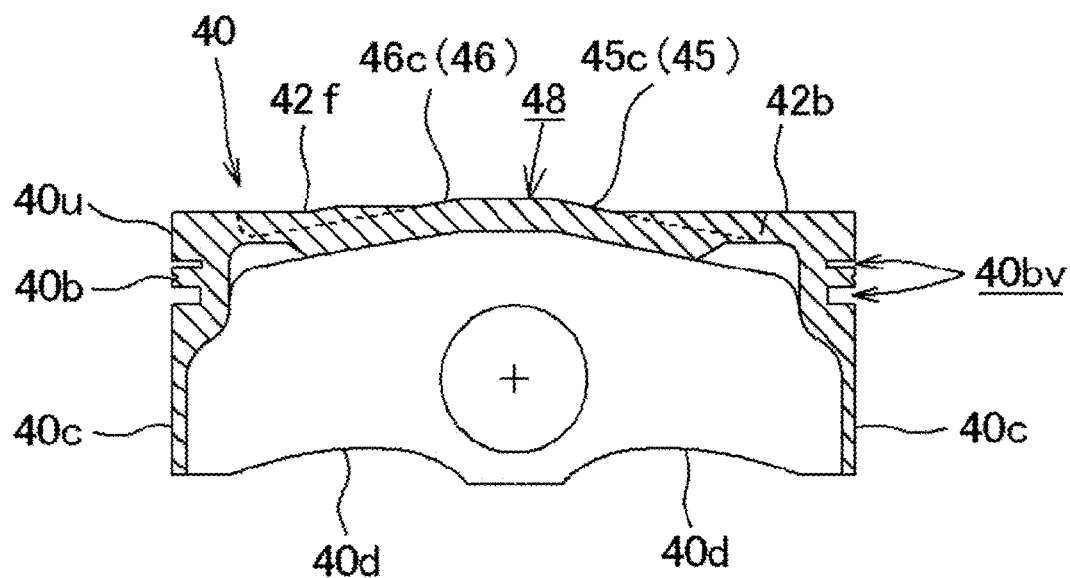
FIG. 8 is a sectional view of the piston, taken along the line VIII-VIII in FIG. 5.

As shown in FIG. 5, an intake-side common flat surface 45c (grating-hatched portion in FIG. 5) is formed by extending from the pair of right and left intake valve recess bottom surfaces 45i (scattered dot portions in FIG. 5) toward the center of the piston crown 41. The intake-side common flat surface 45c makes the intake valve recess bottom surfaces 45i continuous with each other. This intake-side common flat surface 45c and the pair of intake valve recess bottom surfaces 45i form an intake-side inclined flat surface 45 on the same plane.

Similarly, an exhaust-side common flat surface 46c (grating-hatched portion in FIG. 5) is formed by extending from the pair of right and left exhaust valve recess bottom surfaces 46e (scattered dot portions in FIG. 5) toward the center of the piston crown 41. The exhaust-side common flat surface 46c makes the exhaust valve recess bottom surfaces 46e, 46e continuous with each other. This exhaust-side common flat surface 46c and the pair of exhaust valve recess bottom surfaces 46e form an exhaust-side inclined flat surface 46 on the same plane.

The intake-side inclined flat surface 45 and the exhaust-side inclined flat surface 46 intersect each other at an angle of approximately 160 degrees, and are formed into a pent-roof shape with a ridge line formed at the intersection of the two.

As shown in FIG. 5, the area of the intake valve recess bottom surface 45i facing the head portion 53a of the intake valve 53 is larger than that of the exhaust valve recess bottom surface 46e facing the head portion 54a of the exhaust valve 54. Nevertheless, the exhaust-side inclined flat surface 46, particularly the exhaust-side common flat surface 46c thereof, extends into the intake valve recesses 43. Thereby, a ridge line 47 is located within the intake valve recesses 43.

Figure 9:
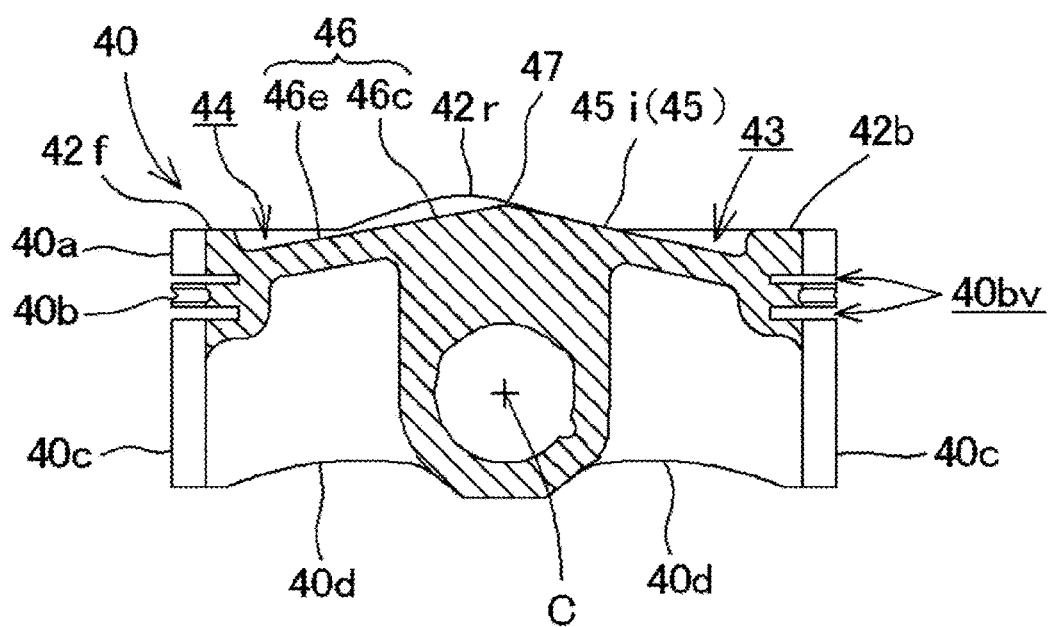
FIG. 9 is a sectional view of the piston, taken along the line IX-IX in FIG. 5.

A portion, on the exhaust side, of the intake valve recess bottom surface 45i having a larger area constitutes the exhaust-side common flat surface 46c, and the ridge line 47 is located approximately at the center of the piston crown 41 in a front-rear direction, and located substantially right above and in parallel to a pin hole central axis of the pin bosses 40e, pivotally supporting the piston pin 36p (see FIG. 9). The ridge line 47 is on the cylinder central axis L in the side view (see FIG. 10).

Hence, exhaust-side end portions 43we, extending to the exhaust side (front side), of the inner peripheral walls 43w of the intake valve recesses 43 are located on the exhaust side (front side) beyond the ridge line 47 in such a manner as to extend around outer-peripheral end portions of the ridge line 47 (see FIG. 5).

Furthermore, in a plan view of the piston crown shown in FIG. 5, tangent lines T at the exhaust-side end portions 43we to wall surfaces, curved to the exhaust-side end portions 43we, of the inner peripheral walls 43w of the intake valve recesses 43 extend on the exhaust-side inclined flat surface 46 without intersecting the front-side land portion 42f of the piston crown 41.

Note that a central recessed portion 48, which the electrode portion 70a at the tip end of the spark plug 70 faces, is formed at the center in the right-left direction of the ridge line 47, that is, approximately at the center of the piston crown 41.

The piston 40 used in the four-valve four-stroke internal combustion engine 30 according to the embodiment has a structure as described above.

The state of surroundings of the combustion chamber 50 when the piston 40 is at a top dead center is illustrated in the sectional view in FIG. 10.

Figure 11:
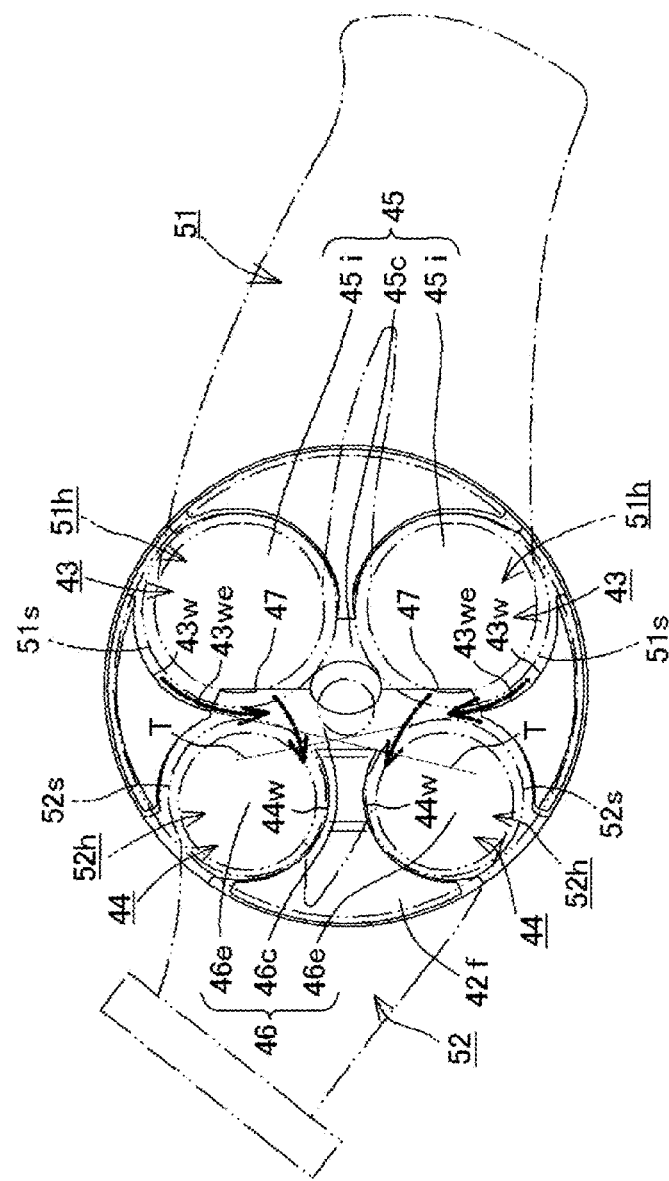
FIG. 11 is a top view of the piston, illustrating a relative positional relation of intake ports and exhaust ports with respect to a piston crown in a plan view of the piston crown when the piston is at the top dead center.

In addition, a relative positional relation of the intake ports 51 and the exhaust ports 52 with respect to the piston crown 41 when the piston 40 is at the top dead center is illustrated in a plan view of the piston crown in FIG. 11.

Note that, in FIG. 11, the intake ports 51 and the exhaust ports 52 are drawn by chain double-dashed lines in relation to the piston crown 41.

The piston crown 41 of the piston 40 is formed into a pent-roof shape with the ridge line 47 at the intersection of the intake-side inclined flat surface 45 formed in a single plane by the pair of intake valve recess bottom surfaces 45i and the intake-side common flat surface 45c and the exhaust-side inclined flat surface 46 formed in a single plane by the pair of exhaust valve recess bottom surfaces 46e and the exhaust-side common flat surface 46c.

When the piston 40 is at the top dead center, the intake valve 53 and the exhaust valve 54 are in an overlapping state where the two valves are opened. As shown in FIG. 10, the intake valve 53 and the exhaust valve 54 are lowered to open the intake inlet 51h and the exhaust inlet 52h; the head portion 53a of the intake valve 53 and the head portion 54a of the exhaust valve 54 respectively face the intake valve recess 43 and the exhaust valve recess 44 formed in the piston crown 41 of the piston 40 at the top dead center.

The piston crown 41 is formed into the pent-roof shape along the pent-roof ceiling surfaces 50f, 50r of the combustion chamber 50, which the intake valves 53 and the exhaust valves 54 disposed into a V shape each other face. Thus, the volume of the combustion chamber 50 is made as small as possible when the piston 40 is at the top dead center, making it possible to increase the compression ratio.

Note that since the valve angle of the intake valve 53 and the exhaust valve 54 is as low as approximately 20 degrees and the angle formed by the front-half inclined ceiling surface 50f and rear-half inclined ceiling surface 50r in the pent-roof shape of the combustion chamber 50 is as high as approximately 160 degrees, the surface area-to-volume ratio is small and the thermal efficiency is favorable.

As shown in FIGS. 5 and 11, the exhaust-side inclined flat surface 46 extends into the intake valve recesses 43 and the ridge line 47 is located on a side of the piston crown corresponding to the intake valve recesses 43. Accordingly, when the piston 40 is at the top dead center, the intake inlets 51h of the intake ports 51 (drawn by the chain double-dashed lines in FIG. 11) have the ridge line 47 protruding from the front-side exhaust-side inclined flat surface 46 as shown in FIGS. 10 and 11. Thereby, part of intake air sucked into the combustion chamber 50 through the intake inlets 51h along the head portions 53a of the intake valves 53 to the exhaust side directly flows to the exhaust-side inclined flat surface 46 side beyond the ridge line 47 as shown in the broken arrows to the exhaust side in FIGS. 10 and 11. Thus, the intake efficiency can be increased.

Moreover, as shown in FIG. 11, the exhaust-side end portions 43we, extending to the exhaust side, of the inner peripheral walls 43w of the intake valve recesses 43 are formed at positions on the exhaust side beyond the ridge line 47 in such a manner as to extend around the outer-peripheral end portions of the ridge line 47. Accordingly, when the piston 40 is at the top dead center, of the intake air sucked into the combustion chamber 50 through the intake inlets 51h opened and closed by the intake valves 53, intake air guided to the inner peripheral walls 43w of the intake valve recesses 43 can flow to the exhaust-side inclined flat surface 46 side from the exhaust-side end portions 43we after going around the outer-peripheral end portions of the ridge line 47, as shown in the broken arrows along the inner peripheral walls 43w in FIG. 11. Thus, the intake efficiency can be further increased.

Furthermore, in the plan view of the piston crown, the tangent lines T at the exhaust-side end portions 43we of the intake valve recesses 43 extend on the exhaust-side inclined flat surface 46 without intersecting the inner peripheral walls 44w of the exhaust valve recesses 44 at a central portion of the piston crown 41, that is, without intersecting the front-side land portion 42f. Accordingly, when the piston 40 is at the top dead center, intake air flows to the exhaust-side inclined flat surface 46 side in directions of the tangent lines T from the exhaust-side end portions 43we in such a manner as to go around the outer-peripheral end portions of the ridge line 47 smoothly along the exhaust-side common flat surface 46c without being blocked by the front-side land portion 42f (the inner peripheral walls 44w of the exhaust valve recesses 44). Thereby, the intake efficiency is increased, and the intake air flows in toward the central portion of the piston crown 41. This can make more favorable the ignitability of the spark plug 70 located approximately on the cylinder central axis L.

The ridge line 47 of the piston crown 41 is located substantially right above and in parallel to the pin hole central axis of the pin boss portions 40e pivotally supporting the piston pin 36p. This makes it possible to increase the engine performance by forming thick upper portions of the pin boss portions 40e to ensure that the pin boss portions 40e have a sufficient strength and by forming the pin hole close to the piston crown 41 to reduce the weight of the piston 40.

The intake ports 51 opened to the combustion chamber 50 extend from the curved portions near the intake inlets 51h to the upstream side at the angle α of 45 degrees or lower with respect to the plane perpendicular to the cylinder central axis L that is a central axis of the cylinder bore. Accordingly, the intake air sucked into the combustion chamber 50 from the intake ports 51 increases the amount flowing to the exhaust side. When the piston 40 is at the top dead center, the amount of intake air directly flowing to the exhaust-side inclined flat surface 46 side is particularly increased. Thus, the intake efficiency can be more increased.

The internal combustion engine 30 is mounted on a small vehicle with the cylinder central axis L directed substantially vertically. The intake ports 51 extend to the rear side of the vehicle. Accordingly, the air cleaner 24 connected to the intake ports 51 can be disposed at a low position below the seat 18. The height of the seat 18 is lowered and confined, and the longitudinal length of the vehicle is shortened and confined. Thus, the size reduction of the vehicle is achieved.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A piston structure for a four-valve four-stroke internal combustion engine in which a pair of intake valves and a pair of exhaust valves are provided in a cylinder head at positions around a spark plug, located approximately on a cylinder central axis, and are disposed into a V-shape facing a combustion chamber, comprising:
 a piston crown of a piston, said piston crown comprising
  a pair of intake valve recesses and a pair of exhaust valve recesses respectively facing head portions of the intake valves and head portions of the exhaust valves;
  an intake-side inclined flat surface which is a single plane defined by bottom surfaces of said pair of intake valve recesses;
  an intake-side common flat surface which extends from said bottom surfaces of said pair of intake valve recesses toward a center of said piston crown such that said bottom surfaces are continuous with each other;
  an exhaust-side inclined flat surface which is a single plane defined by bottom surfaces of said pair of exhaust valve recesses; and
  an exhaust-side common flat surface which extends from said bottom surfaces of said pair of exhaust valve recesses toward the center of said piston crown such that said bottom surfaces are continuous with each other,
 wherein said intake-side inclined flat surface and said exhaust-side inclined flat surface are formed into a pent-roof shape with a ridge line at an intersection therebetween,
 wherein said exhaust-side inclined flat surface extends into said pair of intake valve recesses, and
 wherein said ridge line is located on a side of said piston crown corresponding to said pair of intake valve recesses.

2. The piston structure for internal combustion engine according to claim 1, wherein exhaust-side end portions of inner peripheral walls of said pair of intake valve recesses are formed at positions on an exhaust side of said ridge line so as to extend around outer-peripheral end portions of said ridge line.

3. The piston structure for internal combustion engine according to claim 2, wherein, in a plan view of said piston crown, tangent lines at said exhaust-side end portions on curved wall surfaces of said inner peripheral walls of said pair of intake valve recesses extend on said exhaust-side inclined flat surface without intersecting inner peripheral walls of said pair of exhaust valve recesses at a central portion of said piston crown.

4. The piston structure for internal combustion engine according to claim 1, wherein said ridge line is located substantially directly above and in parallel to a pin hole central axis of a pin boss portion pivotally supporting a piston pin.

5. The piston structure for internal combustion engine according to claim 2, wherein said ridge line is located substantially directly above and in parallel to a pin hole central axis of a pin boss portion pivotally supporting a piston pin.

6. The piston structure for internal combustion engine according to claim 3, wherein said ridge line is located substantially directly above and in parallel to a pin hole central axis of a pin boss portion pivotally supporting a piston pin.

7. The piston structure for internal combustion engine according to claim 1, wherein intake ports opened to the combustion chamber extend upstream from curved portions of the combustion chamber near intake inlets at an angle of 45 degrees or less, with respect to a plane perpendicular to said cylinder central axis.

8. The piston structure for internal combustion engine according to claim 2, wherein intake ports opened to the combustion chamber extend upstream from curved portions of the combustion chamber near intake inlets at an angle of 45 degrees or less, with respect to a plane perpendicular to said cylinder central axis.

9. The piston structure for internal combustion engine according to claim 3, wherein intake ports opened to the combustion chamber extend upstream from curved portions of the combustion chamber near intake inlets at an angle of 45 degrees or less, with respect to a plane perpendicular to said cylinder central axis.

10. The piston structure for internal combustion engine according to claim 4, wherein intake ports opened to the combustion chamber extend upstream from curved portions of the combustion chamber near intake inlets at an angle of 45 degrees or less, with respect to a plane perpendicular to said cylinder central axis.

11. The piston structure for internal combustion engine according to claim 5, wherein intake ports opened to the combustion chamber extend upstream from curved portions of the combustion chamber near intake inlets at an angle of 45 degrees or less, with respect to a plane perpendicular to said cylinder central axis.

12. The piston structure for internal combustion engine according to claim 6, wherein intake ports opened to the combustion chamber extend upstream from curved portions of the combustion chamber near intake inlets at an angle of 45 degrees or less, with respect to a plane perpendicular to said cylinder central axis.

13. The piston structure for internal combustion engine according to claim 7,
    wherein the internal combustion engine is mounted on a vehicle with the cylinder central axis directed substantially vertically, and
    wherein the intake ports extend rearward.

14. The piston structure for internal combustion engine according to claim 8,
    wherein the internal combustion engine is mounted on a vehicle with the cylinder central axis directed substantially vertically, and
    wherein the intake ports extend rearward.

15. The piston structure for internal combustion engine according to claim 9,
    wherein the internal combustion engine is mounted on a vehicle with the cylinder central axis directed substantially vertically, and
    wherein the intake ports extend rearward.

16. The piston structure for internal combustion engine according to claim 10,
    wherein the internal combustion engine is mounted on a vehicle with the cylinder central axis directed substantially vertically, and
    wherein the intake ports extend rearward.

17. The piston structure for internal combustion engine according to claim 11,
    wherein the internal combustion engine is mounted on a vehicle with the cylinder central axis directed substantially vertically, and
    wherein the intake ports extend rearward.

18. The piston structure for internal combustion engine according to claim 12,
    wherein the internal combustion engine is mounted on a vehicle with the cylinder central axis directed substantially vertically, and
    wherein the intake ports extend rearward.

* * * * *